(12) United States Patent
Guedalia et al.

(10) Patent No.: US 9,411,632 B2
(45) Date of Patent: Aug. 9, 2016

(54) PARALLEL METHOD FOR AGGLOMERATIVE CLUSTERING OF NON-STATIONARY DATA

(71) Applicant: Qualcomm Incorporated, San Diego, CA (US)

(72) Inventors: Isaac David Guedalia, Bet Shemesh (IL); Sarah Glickfield, Jerusalem (IL)

(73) Assignee: QUALCOMM INCORPORATED, San Diego, CA (US)

(*) Notice: Subject to any disclaimer, the term of this patent is extended or adjusted under 35 U.S.C. 154(b) by 216 days.

(21) Appl. No.: 13/906,169

(22) Filed: May 30, 2013

(65) Prior Publication Data

US 2014/0359626 A1    Dec. 4, 2014

(51) Int. Cl.
G06F 9/46 (2006.01)
G06F 15/173 (2006.01)
G06F 9/54 (2006.01)
G06N 5/04 (2006.01)
G06N 99/00 (2010.01)

(52) U.S. Cl.
CPC ........ *G06F 9/466* (2013.01); *G06F 9/54* (2013.01); *G06N 5/043* (2013.01); *G06N 99/005* (2013.01)

(58) Field of Classification Search
None
See application file for complete search history.

(56) References Cited

U.S. PATENT DOCUMENTS

| | | | | |
|---|---|---|---|---|
| 5,404,561 A * | 4/1995 | Castelaz | ............. | G06K 9/6222 712/17 |
| 5,787,420 A * | 7/1998 | Tukey | ................. | G06F 17/3071 |
| 6,269,376 B1 * | 7/2001 | Dhillon et al. | ................ | 707/613 |
| 6,466,946 B1 * | 10/2002 | Mishra et al. | | |
| 7,631,107 B2 | 12/2009 | Pandya | | |
| 7,962,607 B1 * | 6/2011 | Chang | ..................... | G06F 13/00 709/224 |
| 7,979,426 B2 * | 7/2011 | Jeong | ................ | G06F 17/30702 706/46 |
| 8,170,966 B1 * | 5/2012 | Musat et al. | ..................... | 706/16 |
| 8,300,951 B1 * | 10/2012 | Mech | ..................... | G06T 7/608 382/203 |
| 8,325,748 B2 * | 12/2012 | Campos | ............... | G06K 9/6224 345/420 |
| 2005/0234880 A1 * | 10/2005 | Zeng et al. | ........................ | 707/3 |
| 2006/0031628 A1 | 2/2006 | Sharma | | |
| 2008/0091428 A1 * | 4/2008 | Bellegarda | ............. | G10L 13/06 704/254 |
| 2008/0288523 A1 * | 11/2008 | Blose | .................. | G06F 17/3028 |

(Continued)

OTHER PUBLICATIONS

Che S., et al., "A performance study of general-purpose applications on graphics processors using CUDA," Oct. 1, 2008, Journal of Parallel and Distributed Computing, Elsevier, Amsterdam, NL, p. 1370-1380, XP025435143, ISSN: 0743-7315.

(Continued)

*Primary Examiner* — Adam Lee
(74) *Attorney, Agent, or Firm* — Muncy, Geissler, Olds & Lowe, P.C.

(57) ABSTRACT

The disclosure is directed to clustering a stream of data points. An aspect receives the stream of data points, determines a plurality of cluster centroids, divides the plurality of cluster centroids among a plurality of threads and/or processors, assigns a portion of the stream of data points to each of the plurality of threads and/or processors, and combines a plurality of clusters generated by the plurality of threads and/or processors to generate a global universe of clusters. An aspect assigns a portion of the stream of data points to each of a plurality of threads and/or processors, wherein each of the plurality of threads and/or processors determines one or more cluster centroids and generates one or more clusters around the one or more cluster centroids, and combines the one or more clusters from each of the plurality of threads and/or processors to generate a global universe of clusters.

64 Claims, 6 Drawing Sheets

(56) References Cited

U.S. PATENT DOCUMENTS

| | | | |
|---|---|---|---|
| 2009/0210406 A1* | 8/2009 | Freire et al. | 707/5 |
| 2009/0307176 A1* | 12/2009 | Jeong | G06F 17/30702 706/52 |
| 2010/0239139 A1* | 9/2010 | Hunt | H01J 49/0036 382/128 |
| 2010/0293206 A1 | 11/2010 | Ylonen | |
| 2011/0246123 A1* | 10/2011 | DelloStritto | A61B 5/11 702/141 |
| 2012/0158857 A1 | 6/2012 | Loofbourrow | |
| 2013/0024579 A1* | 1/2013 | Zhang et al. | 709/230 |
| 2013/0026151 A1 | 1/2013 | Adachi et al. | |
| 2013/0080457 A1* | 3/2013 | Narayanan | H04W 4/021 707/758 |
| 2013/0097167 A1* | 4/2013 | St. Jacques, Jr. | G06F 17/30011 707/737 |
| 2013/0262465 A1* | 10/2013 | Galle et al. | 707/737 |
| 2013/0263151 A1* | 10/2013 | Li et al. | 718/105 |
| 2013/0267239 A1* | 10/2013 | Stancanelli | H04B 7/024 455/452.1 |
| 2013/0325862 A1* | 12/2013 | Black | G06F 17/30598 707/737 |
| 2014/0214420 A1* | 7/2014 | Yao et al. | 704/243 |
| 2014/0221022 A1* | 8/2014 | Vaccari et al. | 455/456.6 |
| 2014/0337537 A1* | 11/2014 | Raajaratnam et al. | 709/228 |

OTHER PUBLICATIONS

International Search Report and Written Opinion—PCT/US2014/040018—ISA/EPO—Oct. 6, 2014.

Li Y., et al., "Speeding up K-Means Algorithm by GPUs," Jun. 29, 2010, Computer and Information Technology (CIT), 2010 IEEE 10th International Conference on, IEEE, Piscatawayt NJt USAt pp. 115-122, XP031758033, ISBN: 978-1-4244-7547-6.

Zechner M., et al., "Accelerating K-Means on the Graphics Processor via CUDA," Apr. 20, 2009, Intensive Applications and Services, 2009. Intensive '09. First International Conference on, IEEE, Piscataway, NJ, USA, pp. 7-15, XP031461068, ISBN: 978-1-4244-3683-5.

Lv Z., et al., "Parallel K-Means Clustering of Remote Sensing Images Based on MapReduce," Web Information Systems and Mining, 2010, vol. 6318, pp. 162-170.

Zhang J., et al., "A Parallel K-means Clustering Algorithm with MPI," Fourth International Symposium on Parallel Architectures, Algorithms and Programming (PAAP), IEEE, 2011, pp. 60-64.

* cited by examiner

```
1:
2:
3:   MSE = LargeNumber;
4:
5:   Select k initial cluster centroids $\{m_j\}_{j=1}^{k}$;
6:
7:
8:   do  {
9:       OldMSE = MSE;
10:      MSE' = 0;
11:      for j = 1 to k
12:          m'_j = 0; n'_j = 0;
13:      endfor;
14:      for i = 1 to n
15:          for j = 1 to k
16:              compute squared Euclidean
                     distance $d^2(\chi_i, m_j)$;
17:          endfor;
18:          find the closest centroid $m_e$ to $\chi_i$;
19:          m'_e = m'_e + $\chi_i$ ;n'_e + 1;
20:          MSE' = MSE' + $d^2$ ($\chi_i$ ;m'_e);
21:      endfor;
22:      for j = 1 to k
23:
24:
25:          n      = max(n'_j ,1); m_j = m'_j/n_j ;
26:      endfor;
27:      MSE = MSE';
28: }while (MSE < OldMSE)
```

PARALLEL METHOD FOR AGGLOMERATIVE CLUSTERING OF NON-STATIONARY DATA

BACKGROUND OF THE INVENTION

1. Field of the Invention

Aspects of the disclosure are directed to a parallel method for agglomerative clustering of non-stationary data.

2. Description of the Related Art

Clustering is the grouping of data points into clusters. Practical applications of clustering include unsupervised classification and taxonomy generation, nearest neighbor searching, scientific discovery, vector quantization, text analysis, and navigation.

One common clustering algorithm is the k-means clustering algorithm. The algorithm assumes that the data "objects" to be clustered are available as points (or vectors) in a d-dimensional Euclidean space. The K-means algorithm seeks a minimum variance grouping of data that minimizes the sum of squared Euclidean distances from certain cluster centroids. The popularity of the K-means algorithm can be attributed to its relative ease of interpretation, implementation simplicity, scalability, convergence speed, adaptability to sparse data, and ease of out-of-core (out of the local memory of a single processor) implementation.

A problem with clustering is that it can take significant memory and processing power. For example, the received data points are typically stored in memory and clustered into a single universe of clusters. To speed up the processing of the stored data, parallel processing techniques can be employed to cluster the data. However, if the clustering is being performed by a mobile device and the data is being generated by sensors, such as an accelerometer or a microphone, there may be too much data to store in memory and then process. Instead, the data must be processed "on the fly."

SUMMARY

Aspects of the disclosure are directed to clustering a stream of data points. A method for clustering a stream of data points includes receiving the stream of data points, determining a plurality of cluster centroids, divides the plurality of cluster centroids among a plurality of threads and/or processors, assigning a portion of the stream of data points to each of the plurality of threads and/or processors, and combining a plurality of clusters generated by the plurality of threads and/or processors to generate a global universe of clusters.

A method for clustering a stream of data points includes receiving the stream of data points, assigning a portion of the stream of data points to each of a plurality of threads and/or processors, wherein, each of the plurality of threads and/or processors determines one or more cluster centroids and generates one or more clusters around the one or more cluster centroids, and combining the one or more clusters from each of the plurality of threads and/or processors to generate a global universe of clusters.

An apparatus for clustering a stream of data points includes logic configured to receive the stream of data points, logic configured to determine a plurality of cluster centroids, logic configured to divide the plurality of cluster centroids among a plurality of threads and/or processors, logic configured to assign a portion of the stream of data points to each of the plurality of threads and/or processors, and logic configured to combine a plurality of clusters generated by the plurality of threads and/or processors to generate a global universe of clusters.

An apparatus for clustering a stream of data points includes logic configured to receive the stream of data points, logic configured to assign a portion of the stream of data points to each of a plurality of threads and/or processors, wherein each of the plurality of threads and/or processors determines one or more cluster centroids and generates one or more clusters around the one or more cluster centroids, and logic configured to combine the one or more clusters from each of the plurality of threads and/or processors to generate a global universe of clusters.

An apparatus for clustering a stream of data points includes means for receiving the stream of data points, means for determining a plurality of cluster centroids, means for dividing the plurality of cluster centroids among a plurality of threads and/or processors, means for assigning a portion of the stream of data points to each of the plurality of threads and/or processors, and means for combining a plurality of clusters generated by the plurality of threads and/or processors to generate a global universe of clusters.

An apparatus for clustering a stream of data points includes means for receiving the stream of data points, means for assigning a portion of the stream of data points to each of a plurality of threads and/or processors, wherein each of the plurality of threads and/or processors determines one or more cluster centroids and generates one or more clusters around the one or more cluster centroids, and means for combining the one or more clusters from each of the plurality of threads and/or processors to generate a global universe of clusters.

A non-transitory computer-readable medium for clustering a stream of data points includes at least one instruction to receive the stream of data points, at least one instruction to determine a plurality of cluster centroids, at least one instruction to divide the plurality of cluster centroids among a plurality of threads and/or processors, at least one instruction to assign a portion of the stream of data points to each of the plurality of threads and/or processors, and at least one instruction to combine a plurality of clusters generated by the plurality of threads and/or processors to generate a global universe of clusters.

A non-transitory computer-readable medium for clustering a stream of data points includes at least one instruction to receive the stream of data points, at least one instruction to assign a portion of the stream of data points to each of a plurality of threads and/or processors, wherein each of the plurality of threads and/or processors determines one or more cluster centroids and generates one or more clusters around the one or more cluster centroids, and at least one instruction to combine the one or more clusters from each of the plurality of threads and/or processors to generate a global universe of clusters.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

Figure 1:
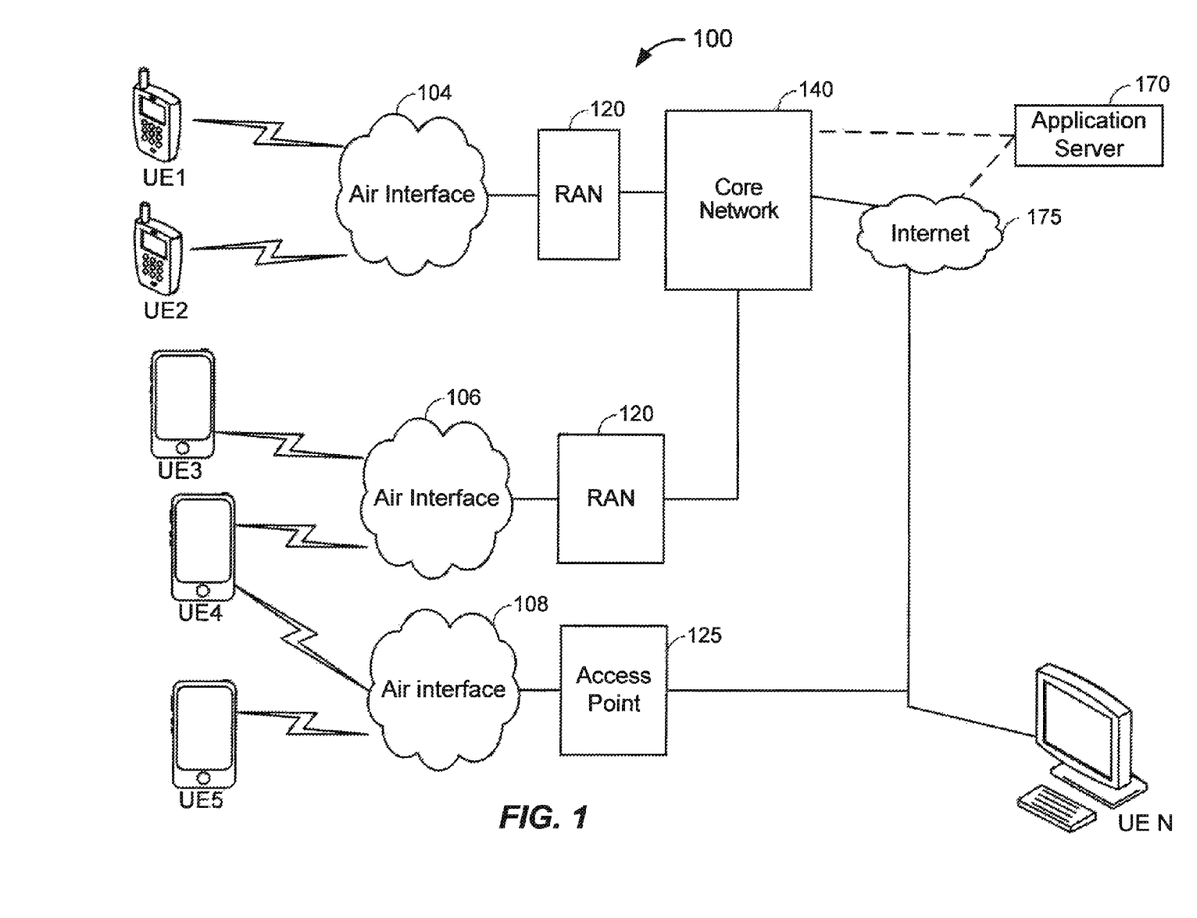
FIG. 1 illustrates a high-level system architecture of a wireless communications system in accordance with an aspect of the disclosure.

FIG. 1 illustrates a high-level system architecture of a wireless communications system 100 in accordance with an aspect of the disclosure. The wireless communications system 100 contains UEs 1 ... N. The UEs 1 ... N can include cellular telephones, personal digital assistant (PDAs), pagers, a laptop computer, a desktop computer, and so on. For example, in FIG. 1, UEs 1 ... 2 are illustrated as cellular calling phones, UEs 3 ... 5 are illustrated as cellular touch-screen phones or smart phones, and UE N is illustrated as a desktop computer or personal computer (PC).

Referring to FIG. 1, UEs 1 ... N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., Code Division Multiple Access (CDMA), Evolution-Data Optimized (EV-DO), Evolved High Rate Packet Data (eHRPD), Global System of Mobile Communication (GSM), Enhanced Data rates for GSM Evolution (EDGE), Wideband CDMA (W-CDMA), Long-Term Evolution (LTE), etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access, nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 ... N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PIT) sessions, group communication sessions, social networking services, etc.) for UEs that can connect to the application server 170 via the core network 140 and/or the Internet 175.

Figure 2:
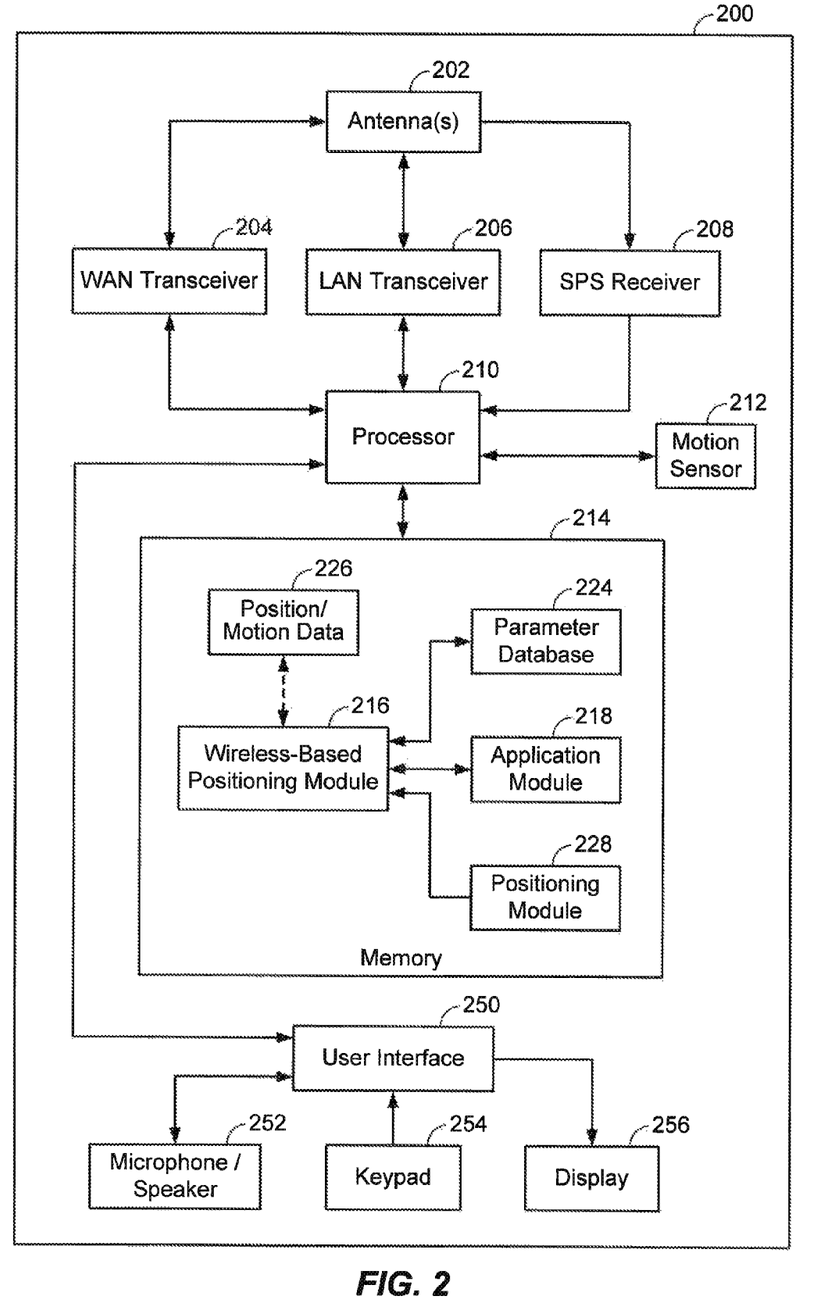
FIG. 2 is a block diagram illustrating various components of an exemplary user equipment (UE).

FIG. 2 is a block diagram illustrating various components of an exemplary UE 200. For the sake of simplicity, the various features and functions illustrated in the box diagram of FIG. 2 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

The UE 200 may include one or more wide area network (WAN) transceiver(s) 204 that may be connected to one or more antennas 202. The WAN transceiver 204 comprises suitable devices, hardware, and/or software for communicating with and/or detecting signals to/from WAN-WAPs, such as access point 125, and/or directly with other wireless devices within a network. In one aspect, the WAN transceiver 204 may comprise a CDMA communication system suitable for communicating with a CDMA network of wireless base stations; however in other aspects, the wireless communication system may comprise another type of cellular telephony network, such as, for example, TDMA or GSM. Additionally, any other type of wide area wireless networking technologies may be used, for example, WiMAX (802.16), etc. The UE 200 may also include one or more local area network (LAN) transceivers 206 that may be connected to one or more antennas 202. The LAN transceiver 206 comprises suitable devices, hardware, and/or software for communicating with and/or detecting signals to/from LAN-WAPs, such as access point 125, and/or directly with other wireless devices within a network. In one aspect, the LAN transceiver 206 may comprise a Wi-Fi (802.11x) communication system suitable for communicating with one or more wireless access points; however in other aspects, the LAN transceiver 206 comprise another type of local area network, personal area network, (e.g., Bluetooth). Additionally, any other type of wireless networking technologies may be used, for example, Ultra Wide Band, ZigBee, wireless USB etc.

As used herein, the abbreviated term "wireless access point" (WAP) may be used to refer to LAN-WAPs and/or WAN-WAPs. Specifically, in the description presented below, when the term "WAP" is used, it should be understood that embodiments may include a UE 200 that can exploit signals from a plurality of LAN-WAPs, a plurality of WAN-WAPs, or any combination of the two. The specific type of WAP being utilized by the UE 200 may depend upon the environment of operation. Moreover, the UE 200 may dynamically select between the various types of WAPs in order to arrive at an accurate position solution. In other embodiments, various network elements may operate in a peer-to-peer manner, whereby, for example, the UE 200 may be replaced with the WAP, or vice versa. Other peer-to-peer embodiments may include another UE (not shown) acting in place of one or more WAP.

A satellite positioning system (SPS) receiver 208 may also be included in the UE 200. The SPS receiver 208 may be connected to the one or more antennas 202 for receiving satellite signals. The SPS receiver 208 may comprise any suitable hardware and/or software for receiving and processing SPS signals. The SPS receiver 208 requests information and operations as appropriate from the other systems, and performs the calculations necessary to determine the UE 200's position using measurements obtained by any suitable SPS algorithm.

A motion sensor 212 may be coupled to a processor 210 to provide movement and/or orientation information which is independent of motion data derived from signals received by the WAN transceiver 204, the LAN transceiver 206 and the SPS receiver 208.

By way of example, the motion sensor 212 may utilize an accelerometer (e.g., a microelectromechanical systems (MEMS) device), a gyroscope, a geomagnetic sensor (e.g., a compass), an altimeter (e.g., a barometric pressure altimeter), and/or any other type of movement detection sensor. Moreover, the motion sensor 212 may include a plurality of different types of devices and combine their outputs in order to provide motion information. For example, the motion sensor 212 may use a combination of a multi-axis accelerometer and orientation sensors to provide the ability to compute positions in 2-D and/or 3-D coordinate systems.

The processor 210 may be connected to the WAN transceiver 204, LAN transceiver 206, the SPS receiver 208 and the motion sensor 212. The processor 210 may include one or more microprocessors, microcontrollers, and/or digital signal processors that provide processing functions, as well as other calculation and control functionality. The processor 210 may also include memory 214 for storing data and software instructions for executing programmed functionality within the UE 200. The memory 214 may be on-board the processor 210 (e.g., within the same integrated circuit (IC) package), and/or the memory may be external memory to the processor and functionally coupled over a data bus. The functional details associated with aspects of the disclosure will be discussed in more detail below.

A number of software modules and data tables may reside in memory 214 and be utilized by the processor 210 in order to manage both communications and positioning determination functionality. As illustrated in FIG. 2, memory 214 may include and/or otherwise receive a wireless-based positioning module 216, an application module 218, and a positioning module 228. One should appreciate that the organization of the memory contents as shown in FIG. 2 is merely exemplary, and as such the functionality of the modules and/or data structures may be combined, separated, and/or be structured in different ways depending upon the implementation of the UE 200.

The application module 218 may be a process running on the processor 210 of the UE 200, which requests position information from the wireless-based positioning module 216. Applications typically run within an upper layer of the software architectures. The wireless-based positioning module 216 may derive the position of the UE 200 using information derived from time information measured from signals exchanged with a plurality of WAPs. In order to accurately determine position using time-based techniques, reasonable estimates of time delays, introduced by the processing time of each WAP, may be used to calibrate/adjust the time measurements obtained from the signals. As used herein, these time delays are referred to as "processing delays."

Calibration to further refine the processing delays of the WAPs may be performed using information obtained by the motion sensor 212. In one embodiment, the motion sensor 212 may directly provide position and/or orientation data to the processor 210, which may be stored in memory 214 in the position/motion data module 226. In other embodiments, the motion sensor 212 may provide data that should be further processed by processor 210 to derive information to perform the calibration. For example, the motion sensor 212 may provide acceleration and/or orientation data (single or multi-axis which can be processed using positioning module 228 to derive position data for adjusting the processing delays in the wireless-based positioning module 216.

After calibration, the position may then be output to the application module 218 in response to its aforementioned request. In addition, the wireless-based positioning module 216 may utilize a parameter database 224 for exchanging operational parameters. Such parameters may include the determined processing delays for each WAP, the WAPs positions in a common coordinate frame, various parameters associated with the network, initial processing delay estimates, etc.

In other embodiments, the additional information may optionally include auxiliary position and/or motion data which may be determined from other sources besides the motion sensor 212, such as from SPS measurements. The auxiliary position data may be intermittent and/or noisy, but may be useful as another source of independent information for estimating the processing delays of the WAPs depending upon the environment in which the UE 200 is operating.

For example, in some embodiments, data derived from the SPS receiver 208 may supplement the position data supplied by the motion sensor 212 (either directly from the position/motion data module 226 or derived by the positioning module 228). In other embodiments, the position data may be combined with data determined through additional networks using non-RTT techniques (e.g., advanced forward link trilateration (AFLT) within a CDMA network). In certain implementations, the motion sensor 212 and/or the SPS receiver 214 may provide all or part of the auxiliary position/motion data 226 without further processing by the processor 210. In some embodiments, the auxiliary position/motion data 226 may be directly provided by the motion sensor 212 and/or the SPS receiver 208 to the processor 210.

While the modules shown in FIG. 2 are illustrated in the example as being contained in the memory 214, it is recognized that in certain implementations such procedures may be provided for or otherwise operatively arranged using other or additional mechanisms. For example, all or part of the wireless-based positioning module 216 and/or the application module 218 may be provided in firmware. Additionally, while in this example the wireless-based positioning module 216 and the application module 218 are illustrated as being separate features, it is recognized, for example, that such procedures may be combined together as one procedure or perhaps with other procedures, or otherwise further divided into a plurality of sub-procedures.

The processor 210 may include any form of logic suitable for performing at least the techniques provided herein. For example, the processor 210 may be operatively configurable based on instructions in the memory 214 to selectively initiate one or more routines that exploit motion data for use in other portions of the UE 200.

The UE 200 may include a user interface 250 which provides any suitable interface systems, such as a microphone/speaker 252, keypad 254, and display 256 that allows user interaction with the UE 200. The microphone/speaker 252 provides for voice communication services using the WAN transceiver 204 and/or the LAN transceiver 206. The keypad 254 comprises any suitable buttons for user input. The display 256 comprises any suitable display, such as a backlit liquid crystal display (LCD), and may further include a touch screen display for additional user input modes.

As used herein, the UE 200 may be any portable or movable device or machine that is configurable to acquire wireless signals transmitted from, and transmit wireless signals to, one or more wireless communication devices or networks. As shown in FIG. 2, the UE 200 is representative of such a portable wireless device. Thus, by way of example but not limitation, the UE 200 may include a radio device, a cellular telephone device, a computing device, a personal communication system (PCS) device, or other like movable wireless communication equipped device, appliance, or machine. The term "user equipment" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "user equipment" is intended to include all devices, including wireless devices, computers, laptops, etc. which are capable of communication with a server, such as via the Internet, or other network, and regardless of whether satellite signal reception, assistance data reception, and/or position-related processing occurs at the device, at a server, or at another device associated with the network. Any operable combination of the above is also considered a "user equipment."

As used herein, the terms "wireless device," "mobile station," "mobile device," "user equipment," etc. may refer to any type of wireless communication device which may transfer information over a network and also have position determination and/or navigation functionality. The wireless device may be any cellular mobile terminal, personal communication system (PCS) device, personal navigation device, laptop, personal digital assistant, or any other suitable device capable of receiving and processing network and/or SPS signals.

Figure 3:
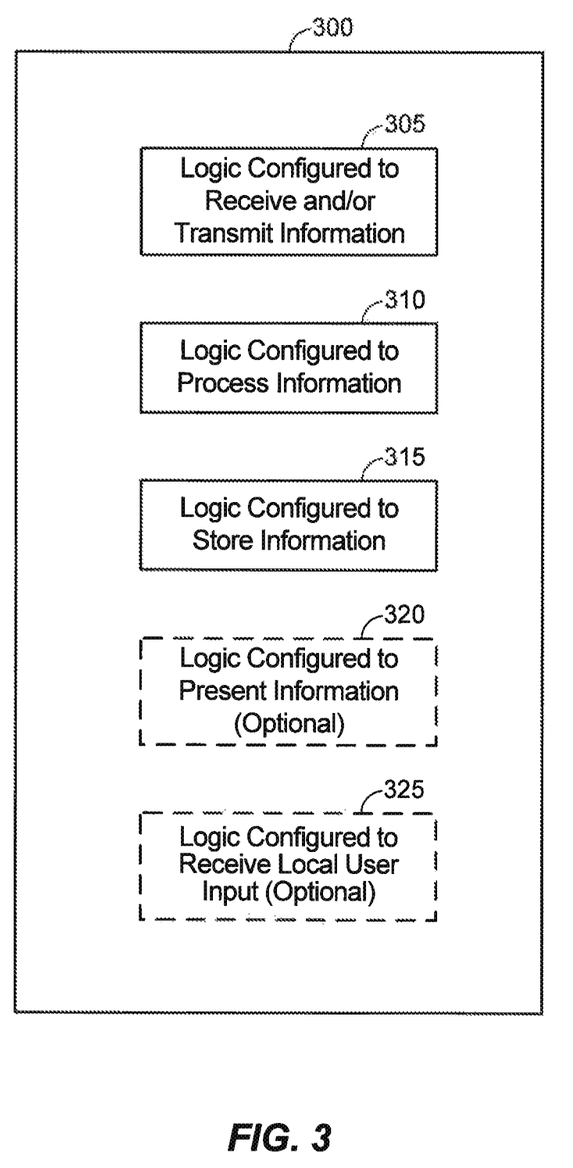
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to UE 200, any component of the RAN 120, any component of the core network 140, any components coupled with the core network 140 and/or the Internet 175 (e.g., the application server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., a radio frequency (RF) antenna, a MODEM, a modulator and/or demodulator, etc.). In another example, the logic configured to receive and/or transmit information 305 can correspond to a wired communications interface (e.g., a serial connection, a universal serial bus (USB) or Firewire connection, an Ethernet connection through which the Internet 175 can be accessed, etc.). Thus, if the communication device 300 corresponds to some type of network-based server (e.g., the application server 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include logic configured to receive a stream of data points. The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. The logic configured to process information 310 can include logic configured to receive a stream of data points, logic configured to determine a plurality of cluster centroids, logic configured to divide the plurality of cluster centroids among a plurality of threads and/or processors, logic configured to assign a portion of the stream of data points to each of the plurality of threads and/or processors, and logic configured to combine a plurality of clusters generated by the plurality of threads and/or processors to generate a global universe of clusters. The logic configured to process information 310 can also include logic configured to receive a stream of data points, logic configured to assign a portion of the stream of data points to each of a plurality of threads and/or processors, wherein each of the plurality of threads and/or processors determines one or more cluster centroids and generates one or more clusters around the one or more cluster centroids, and logic configured to combine the one or more clusters from each of the plurality of threads and/or processors to generate a global universe of clusters. The processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured. to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device a display screen, a port that can carry video information such as USB, high-definition multimedia interface (HDMI), etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200 as shown in FIG. 2, the logic configured to present information 320 can include the display 256 and/or the speaker 252. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond. to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200 as shown in FIG. 2, the logic configured to receive local user input 325 can include the microphone 252, the keypad 254, the display 256, etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Clustering is the grouping of data points into clusters. Practical applications of clustering include unsupervised classification and taxonomy generation, nearest neighbor searching, scientific discovery, vector quantization, text analysis, and navigation.

One common clustering algorithm is the K-means clustering algorithm. The algorithm assumes that the data "objects" to be clustered are available as points (or vectors) in a d-dimensional Euclidean space. The K-means algorithm seeks a minimum variance grouping of data that minimizes the sum of squared Euclidean distances from certain cluster centroids. The popularity of the K-means algorithm can be attributed to its relative ease of interpretation, implementation simplicity, scalability, convergence speed, adaptability to sparse data, and ease of out-of-core (out of the local memory of a single processor) implementation.

Figure 4:
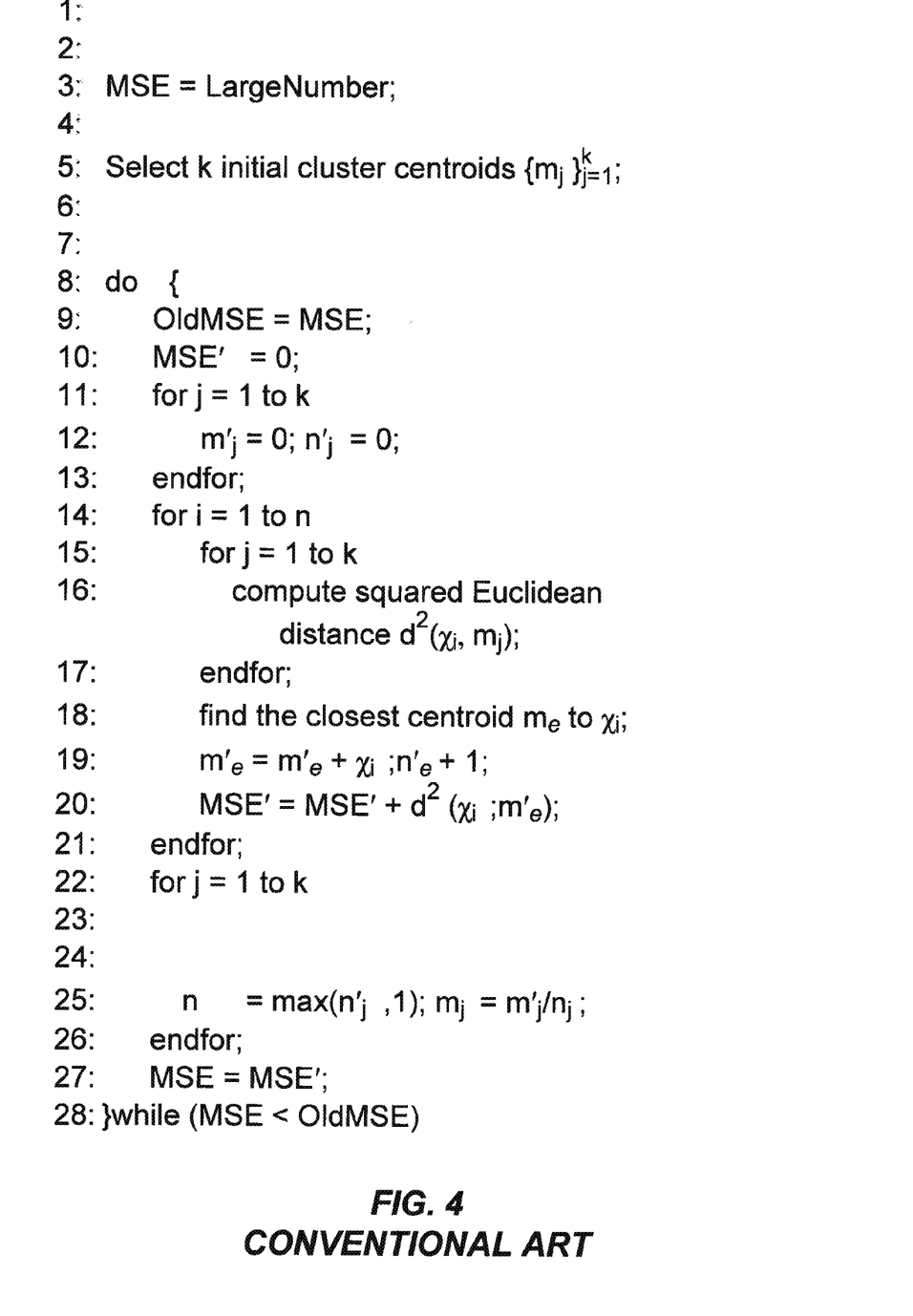
FIG. 4 illustrates an exemplary listing of representative computer program instructions implementing a K-means algorithm.

FIG. 4 illustrates an exemplary listing of representative computer program instructions implementing a k-means algorithm, as illustrated in U.S. Pat. No. 6,269,376. The k-means algorithm comprises essentially four steps:
  (a) Initialization: Select a set of k starting points (as shown in line 5 of FIG. 4). The selection may be performed randomly, or according to some heuristic.
  (b) Distance Calculation: For each data point, compute its Euclidean distance to each cluster centroid and find the closest cluster centroid (as shown in lines 14-21 of FIG. 4). Assign each such data point to the closest cluster centroid.
  (c) Centroid Recalculation: For each cluster centroid, recalculate the cluster centroid as the average of data points assigned to it (as shown in lines 22-26 of FIG. 2).
  (d) Convergence Condition: Repeat steps (b) and (c) until some convergence condition is met (as shown in line 28 of FIG. 4).

The k-means algorithm can be thought of as a gradient-descent algorithm that starts at the initial starting cluster centroids and iteratively updates these centroids to decrease the minimum variance clustering of the data points. This K-means algorithm will always converge to a local minimum, but the particular local minimum may not be the global minimum, and the particular local minimum depends on the initial starting cluster points. Before the algorithm converges, steps (b) and (c) must be executed a number of times. The number of K-means iterations is a positive integer that can vary depending on the initial starting cluster centroids, even on the same data set.

A problem with clustering is that it can take significant memory and processing power. For example, the received data points are typically stored in memory and clustered into a single universe of clusters. To speed up the processing of the stored data, parallel processing techniques can be employed to cluster the data.

The iterations performed during the process of assigning data points to the closest cluster centroid dominate the total computation time. Because the distance calculations shown in lines 14-21 of FIG. 4 can be executed asynchronously and in parallel for each data point, and because the computations performed in these lines dominate the computational complexity of steps (b) and (c), when the number of data points is large, an effective parallelization strategy can be implemented that reduces the computation complexity.

By implementing a version of the K-means algorithm on a distributed memory machine with P processors, the total computation time can be reduced by nearly a factor of P. The strategy is to divide the N data points into P blocks (each of size roughly N/P) and compute lines 14-21 for each of these blocks in parallel on a different processor. By dividing the N data points among P processors, large data sets can be handled by the combined memory of the P processors. For example, a data set of 2 gigabytes would be difficult for most single processors to handle, but can be processed easily when divided among 16 processors, each with a main memory of 256 megabytes.

This method also requires a shared memory between the P processors. The centroids are stored and updated inside the shared memory, thus enabling the coordination of the efforts of the P processors.

However, if the clustering is being performed by a mobile device and the data is being generated by sensors, such as an accelerometer or a microphone, there may be too much data to store in memory and then process. Instead, the data must be processed "on the fly."

The proposed solution assigns received data points to multiple threads (and/or multiple processors if the mobile device is so equipped) running on the processor, such as processor 210, of a UE, such as UE 200, in a round-robin manner. Rather than provisioning each thread with a global set of centroids to cluster its set of incoming data points around, each thread is provisioned a subset of the global set of centroids. For example, given five threads and 100 cluster centroids, rather than provisioning the 100 centroids to each thread, 20 centroids can be provisioned to each of the five threads.

Once each thread has clustered its assigned data points, the clusters are combined into a single/global universe of clusters. For example, if there are five threads and 100 centroids, the centroids can be divided into five groups, with 20 centroids in each group. Each group of 20 centroids will be employed independently by a different thread, which will perform the clustering on the data. When the clustering is finished, the five groups will be concatenated together to create a single group of 100 centroids.

If the data is random and stationary, that is, the data points that are distributed to each thread are similar to each other, then it is likely that the clusters generated by each thread will overlap with the clusters generated by the other threads. In that case, a post processing step may be utilized to merge redundant clusters.

Not all clustering techniques may support this approach of dividing the data and clustering each segment independently and then concatenating the results. Most notably, k-means clustering may result in a poor representation of the data because the K-means criteria for moving a centroid (i.e., adjusting the value of a centroid) is solely dependent on the new data that arrives. As such, the K-means algorithm has a tendency to follow the drift of the data. An online agglomerative clustering method for nonstationary data, called faddc, may be more appropriate for this approach, since the criteria for moving a centroid is construed such as to minimize the "forgetfulness" of the system. This clustering method is described in "An on-line agglomerative clustering method for nonstationary data," by I. D. Guedalia, et al.

A hybrid approach could be employed whereby the K-means algorithm is utilized for the first step, when each group works independently, and the faddc algorithm is utilized in the post-processing stage, when the groups are concatenated. This would, however, require that additional information be stored during the K-means clustering that is typically omitted, such as the number of data points each centroid represented.

Once combined, the UE can perform feature extraction, or data mining, on the combined clusters.

If there are too many data points, or the data points are redundant, the UE can drop data points or reduce the sampling rate (where, for example, the data points are being generated by one or more sensors). Further, if several UEs are coupled over a high-speed data link, whether wired or wireless, the parallel processing can be distributed over the multiple UEs. The UE generating the sensor data can assign it to the other devices and receive the clustering results.

Instead of assigning data points to the multiple threads in a round-robin, or random, manner, the data points can be assigned using a hierarchical distribution method. In that case, a single, very small, set of cluster centroids (e.g. four) is provisioned, and each centroid corresponds to a thread. As each new data point arrives, it is clustered by the set of centroids, and then based on the "winning" centroid (i.e., the centroid around which the data point is clustered), the data point is assigned to the corresponding thread, which then performs the detailed clustering.

In a more complicated example of the hierarchical distribution, there can be more cluster centroids in the small set of centroids than there are threads. In that case, the distribution can be additionally biased by the count associated with the centroids in the smaller/higher level set of centroids.

Figure 5:
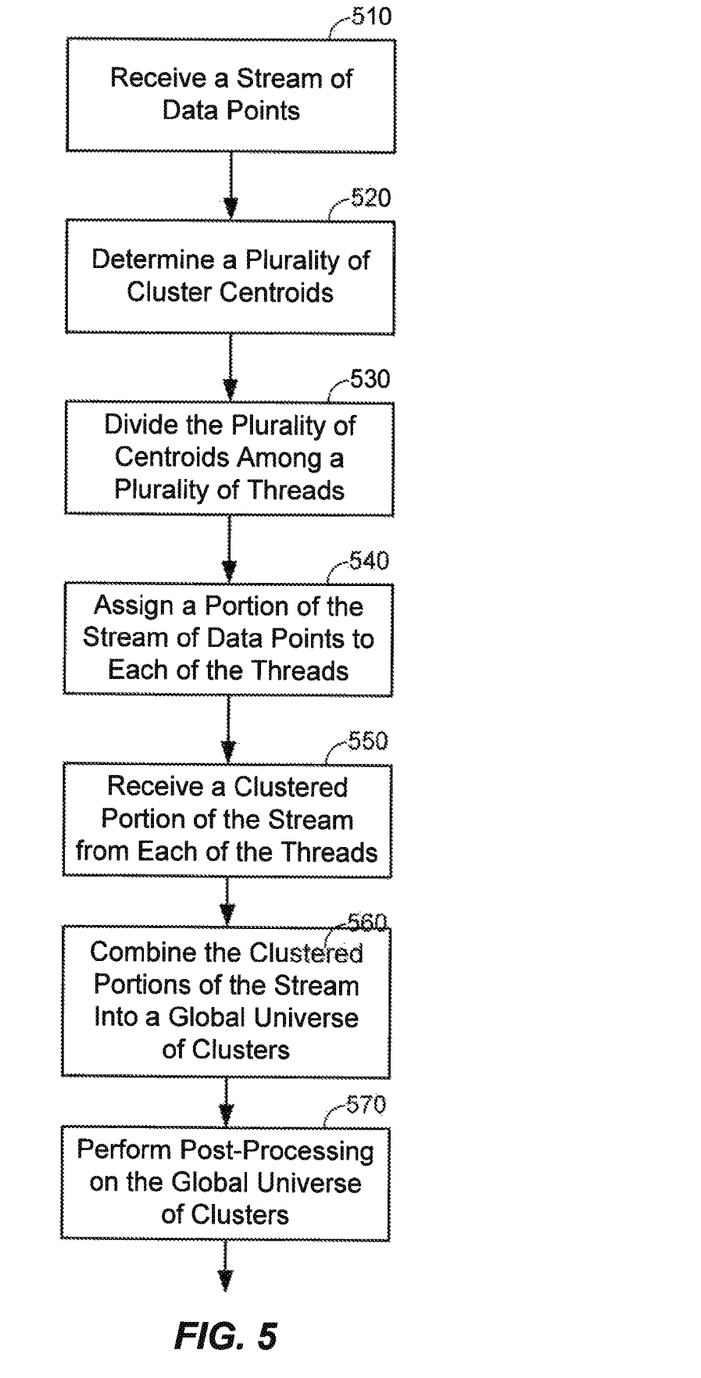
FIG. 5 illustrates an exemplary flow for clustering a stream of data points that may be performed by a UE.

FIG. 5 illustrates an exemplary flow for clustering a stream of data points that may be performed by a UE, such as UE 200.

At 510, the UE receives the stream of data points. The UE may receive the stream of data points from one or more sensors, such as an accelerometer, a gyroscope, a magnetometer, a microphone, and/or the like. If the stream of data points contains too many data points to efficiently process, even with the plurality of threads and/or processors, the UE may drop data points to reduce the number of data points it will have to process. For example, the UE may drop every other data point, or it may only keep every tenth data point. Alternatively, the UE can reduce the sampling rate of the one or more sensors generating the stream of data points to reduce the number of data points it will have to process.

At 520, the UE determines a plurality of cluster centroids. Alternatively, one or more of the plurality of threads may determine one or more centroids during run time. These centroids may be a predetermined number or they may be assigned based on need. For example, if a data point's Euclidean distance to the existing centroids is determined to be too great, the thread may decide to use that data point as a new centroid. That centroid could then be added to the plurality of existing centroids and could then be used for future matching of incoming data points.

At 530, the UE divides the plurality of cluster centroids among a plurality of threads and/or processors. The UE may assign a substantially equal number of centroids to each thread and/or processor. The threads and/or processors may reside on the UE or one or more other UEs in communication with the UE.

At 540, the UE assigns a portion of the stream of data points to each of the plurality of threads and/or processors. The UE may assign data points to the plurality of threads and/or processors in a round-robin manner, randomly, in a hierarchical manner, or the like. If the UE assigns the data points in a hierarchical manner, the UE can provision a small set of cluster centroids, where each of the cluster centroids corresponds to a different thread or processor. The UE can assign incoming data points to one of the set of centroids, and then assign the data point to the thread or processor that corresponds to the centroid around which it was clustered. The number of centroids in the small set of centroids may correspond to the number of threads and/or processors. Alternatively, the number of cluster centroids in the small set of centroids may be larger than the number of threads and/or processors, in which case a data point can be assigned to a thread or processor based on a count of data points associated with each centroid of the set of centroids.

The UE may also consider the speed of each of the plurality of threads and/or processors when assigning the stream of data points.

Each of the plurality of threads and/or processors generate one or more clusters around the subset of the plurality of cluster centroids provisioned to that thread or processor. A thread or processor may begin generating one or more clusters as soon as it begins receiving its portion of the stream of data points. Alternatively, a thread or processor may buffer one or more data points of its portion of data points before beginning to generate the one or more clusters.

At 550, the UE receives one or more clusters from each of the plurality of threads and/or processors. At 560, the UE combines the received clusters to generate a global universe of clusters. At 570, the UE can perform post-processing, such as data mining, on the global universe of clusters.

Figure 6:
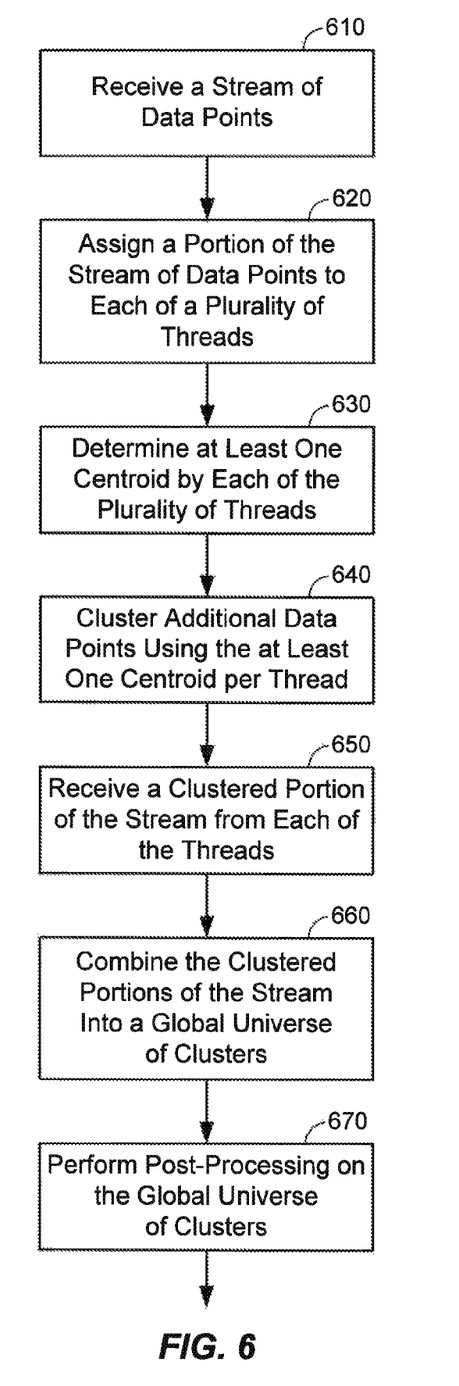
FIG. 6 illustrates an exemplary flow for clustering a stream of data points that may be performed by a UE.

FIG. 6 illustrates an exemplary flow for clustering a stream of data points that may be performed by a UE, such as UE 200. At 610, the UE receives the stream of data points. The UE may receive the stream of data points from one or more sensors, such as an accelerometer, a gyroscope, a magnetometer, a microphone, and/or the like. If the stream of data points contains too many data points to efficiently process, even with the plurality of threads and/or processors, the UE may drop data points to reduce the number of data points it will have to process, as described above.

At 620, the UE assigns a portion of the stream of data points to each of a plurality of threads and/or processors. The UE may assign data points to the plurality of threads and/or processors in a round-robin manner, randomly, in a hierarchical manner, or the like. The UE may also consider the speed of each of the plurality of threads and/or processors when assigning the stream of data points.

At 630, each thread and/or processor determines at least one cluster centroid. These centroids may be assigned by the UE, as in 530 of FIG. 5, or each thread and/or processor may determine the centroids by clustering the incoming data points. For example, if a data point's Euclidean distance to an existing centroid is determined to be too great, the thread may decide to use that data point as a new centroid. That centroid could then be added to the plurality of existing centroids and could then be used for future matching of incoming data points.

At 640, each thread and/or processors cluster incoming data points from its assigned portion of the stream of data points around the cluster centroids it determined in 630. A thread or processor may begin generating one or more clusters as soon as it begins receiving its portion of the stream of data points. Alternatively, a thread or processor may buffer one or more data points of its portion of data points before beginning to generate the one or more clusters.

At 650, the UE receives one or more clusters from each of the plurality of threads and/or processors. At 660, the UE combines the received clusters to generate a global universe of clusters. At 670, the UE can perform post-processing, such as data mining, on the global universe of clusters.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for clustering a stream of data points, comprising:
  receiving the stream of data points;
  determining a plurality of cluster centroids;

dividing the plurality of cluster centroids into a plurality of groups of cluster centroids, wherein each group of the plurality of groups of cluster centroids contains at least one cluster centroid and less than all of the plurality of cluster centroids and is utilized independently by a different thread and/or processor among a plurality of threads and/or processors;

assigning a different portion of the stream of data points to each of the plurality of threads and/or processors, wherein each thread and/or processor of the plurality of threads and/or processors generates a plurality of clusters around the group of the plurality of groups of cluster centroids assigned to the thread and/or processor; and concatenating the plurality of clusters generated by each of the plurality of threads and/or processors to generate a single global universe of clusters.

2. The method of claim 1, wherein the receiving comprises:
receiving the stream of data points from one or more sensors.

3. The method of claim 2, wherein the one or more sensors are one or more of an accelerometer, a gyroscope, a magnetometer, or a microphone.

4. The method of claim 1, wherein the stream of data points is assigned to the plurality of threads and/or processors in a round robin manner.

5. The method of claim 1, wherein the stream of data points is assigned to the plurality of threads and/or processors in a hierarchical manner.

6. The method of claim 5, wherein the assigning the different portion of the stream of data points comprises:
assigning a received data point to one of the plurality of cluster centroids; and
assigning the received data point to a thread or processor corresponding to the one of the plurality of cluster centroids.

7. The method of claim 6, wherein a number of cluster centroids in the plurality of cluster centroids corresponds to a number of threads and/or processors.

8. The method of claim 6, wherein a number of cluster centroids in the plurality of cluster centroids is larger than a number of the plurality of threads and/or processors, and wherein the received data point is assigned to a thread or processor of the plurality of threads and/or processors based on a count of data points associated with each cluster centroid of the plurality of cluster centroids.

9. The method of claim 1, wherein the stream of data points is assigned to the plurality of threads and/or processors based on a speed of each of the plurality of threads and/or processors.

10. The method of claim 1, wherein each of the plurality of threads and/or processors begins generating the plurality of clusters when it begins receiving a portion of the stream of data points.

11. The method of claim 1, wherein each of the plurality of threads and/or processors buffers one or more data points of the different portion of the stream of data points before beginning to generate the plurality of clusters.

12. The method of claim 1, further comprising:
dropping data points in the stream of data points to reduce a number of data points in the stream of data points.

13. The method of claim 1, further comprising:
reducing a sampling rate of one or more sensors generating the stream of data points to reduce a number of data points in the stream of data points.

14. The method of claim 1, further comprising:
performing post-processing on the single global universe of clusters.

15. The method of claim 1, wherein the plurality of threads and/or processors reside on a user equipment.

16. The method of claim 1, wherein the plurality of threads and/or processors reside on a plurality of user equipment.

17. A method for clustering a stream of data points, comprising:
receiving the stream of data points;
assigning a different portion of the stream of data points to each thread and/or processor of a plurality of threads and/or processors, wherein each thread and/or processor of the plurality of threads and/or processors determines one or more cluster centroids, and wherein each thread and/or processor of the plurality of threads and/or processors clusters incoming data points of the portion of the stream of data points assigned to the thread and/or processor around the one or more cluster centroids as the incoming data points are received by the thread and/or processor to generate one or more clusters; and
concatenating the one or more clusters from each of the plurality of threads and/or processors to generate a single global universe of clusters.

18. The method of claim 17, wherein the receiving comprises:
receiving the stream of data points from one or more sensors.

19. The method of claim 18, wherein the one or more sensors are one or more of an accelerometer, a gyroscope, a magnetometer, or a microphone.

20. The method of claim 17, wherein each thread and/or processor of the plurality of threads and/or processors clustering the incoming data points as the incoming data points are received comprises each thread and/or processor of the plurality of threads and/or processors beginning to generate the one or more clusters when the thread and/or processor begins receiving the portion of the stream of data points assigned to the thread and/or processor.

21. The method of claim 17, wherein each thread and/or processor of the plurality of threads and/or processors clustering the incoming data points as the incoming data points are received comprises each thread and/or processor of the plurality of threads and/or processors buffering one or more data points of the portion of the stream of data points assigned to the thread and/or processor before beginning to generate the one or more clusters.

22. The method of claim 17, further comprising:
dropping data points in the stream of data points to reduce a number of data points in the stream of data points.

23. The method of claim 17, further comprising:
reducing a sampling rate of one or more sensors generating the stream of data points to reduce a number of data points in the stream of data points.

24. The method of claim 17, further comprising:
determining a plurality of cluster centroids; and
dividing the plurality of cluster centroids among the plurality of threads and/or processors.

25. The method of claim 24, wherein the plurality of cluster centroids are in addition to cluster centroids determined by the plurality of threads and/or processors.

26. The method of claim 17, wherein each of the plurality of threads and/or processors determines the one or more cluster centroids based on its assigned portion of the stream of data points.

27. The method of claim 17, further comprising:
receiving a clustered portion of the stream of data points from each of the plurality of threads and/or processors.

28. The method of claim 17, further comprising:
performing post-processing on the single global universe of clusters.

29. The method of claim 17, wherein the plurality of threads and/or processors reside on a mobile device.

30. The method of claim 17, wherein the plurality of threads and/or processors reside on a plurality of mobile devices.

31. An apparatus for clustering a stream of data points, comprising:
at least one processor configured to
receive the stream of data points;
determine a plurality of cluster centroids;
divide the plurality of cluster centroids into a plurality of groups of cluster centroids, wherein each group of the plurality of groups of cluster centroids contains at least one cluster centroid and less than all of the plurality of cluster centroids and is utilized independently by a different thread and/or processor among a plurality of threads and/or processors;
assign a different portion of the stream of data points to each of the plurality of threads and/or processors, wherein each thread and/or processor of the plurality of threads and/or processors generates a plurality of clusters around the group of the plurality of groups of cluster centroids assigned to the thread and/or processor; and
concatenate the plurality of clusters generated by each of the plurality of threads and/or processors to generate a single global universe of clusters.

32. The apparatus of claim 31, wherein the at least one processor being configured to receive comprises:
the at least one processor being configured to receive the stream of data points from one or more sensors.

33. The apparatus of claim 32, wherein the one or more sensors are one or more of an accelerometer, a gyroscope, a magnetometer, or a microphone.

34. The apparatus of claim 31, wherein the stream of data points is assigned to the plurality of threads and/or processors in a round robin manner.

35. The apparatus of claim 31, wherein the stream of data points is assigned to the plurality of threads and/or processors in a hierarchical manner.

36. The apparatus of claim 35, wherein the at least one processor being configured to assign the different portion of the stream of data points comprises:
the at least one processor being configured to assign a received data point to one of the plurality of cluster centroids; and
the at least one processor being configured to assign the received data point to a thread or processor corresponding to the one of the plurality of cluster centroids.

37. The apparatus of claim 36, wherein a number of cluster centroids in the plurality of cluster centroids corresponds to a number of threads and/or processors.

38. The apparatus of claim 36, wherein a number of cluster centroids in the plurality of cluster centroids is larger than a number of the plurality of threads and/or processors, and wherein the received data point is assigned to a thread or processor of the plurality of threads and/or processors based on a count of data points associated with each cluster centroid of the plurality of cluster centroids.

39. The apparatus of claim 31, wherein the stream of data points is assigned to the plurality of threads and/or processors based on a speed of each of the plurality of threads and/or processors.

40. The apparatus of claim 31, wherein each of the plurality of threads and/or processors begins generation of the plurality of clusters when it begins reception of a portion of the stream of data points.

41. The apparatus of claim 31, wherein each of the plurality of threads and/or processors buffers one or more data points of the different portion of the stream of data points before beginning to generate the plurality of clusters.

42. The apparatus of claim 31, wherein the at least one processor is further configured to:
drop data points in the stream of data points to reduce a number of data points in the stream of data points.

43. The apparatus of claim 31, wherein the at least one processor is further configured to:
reduce a sampling rate of one or more sensors that generate the stream of data points to reduce a number of data points in the stream of data points.

44. The apparatus of claim 31, wherein the at least one processor is further configured to:
perform post-processing on the single global universe of clusters.

45. The apparatus of claim 31, wherein the plurality of threads and/or processors reside on a user equipment.

46. The apparatus of claim 31, wherein the plurality of threads and/or processors reside on a plurality of user equipments.

47. An apparatus for clustering a stream of data points, comprising:
at least one processor configured to:
receive the stream of data points;
assign a different portion of the stream of data points to each thread and/or processor of a plurality of threads and/or processors, wherein each thread and/or processor of the plurality of threads and/or processors determines one or more cluster centroids, and wherein each thread and/or processor of the plurality of threads and/or processors clusters incoming data points of the portion of the stream of data points assigned to the thread and/or processor around the one or more cluster centroids as the incoming data points are received by the thread and/or processor to generate a one or more clusters; and
concatenate the one or more clusters from each of the plurality of threads and/or processors to generate a single global universe of clusters.

48. The apparatus of claim 47, wherein the at least one processor being configured to receive comprises:
the at least one processor being configured to receive the stream of data points from one or more sensors.

49. The apparatus of claim 48, wherein the one or more sensors are one or more of an accelerometer, a gyroscope, a magnetometer, or a microphone.

50. The apparatus of claim 47, wherein each thread and/or processor of the plurality of threads and/or processors clusters the incoming data points as the incoming data points are received by beginning generation of the one or more clusters when the thread and/or processor begins reception of the portion of the stream of data points assigned to the thread and/or processor.

51. The apparatus of claim 47, wherein each thread and/or processor of the plurality of threads and/or processors clusters the incoming data points as the incoming data points are received by buffering one or more data points of the portion of the stream of data points assigned to the thread and/or processor before beginning to generate the one or more clusters.

52. The apparatus of claim 47, wherein the at least one processor is further configured to:

drop data points in the stream of data points to reduce a number of data points in the stream of data points.

53. The apparatus of claim 47, wherein the at least one processor is further configured to:
reduce a sampling rate of one or more sensors that generate the stream of data points to reduce a number of data points in the stream of data points.

54. The apparatus of claim 47, wherein the at least one processor is further configured to:
determine a plurality of cluster centroids; and
divide the plurality of cluster centroids among the plurality of threads and/or processors.

55. The apparatus of claim 54, wherein the plurality of cluster centroids are in addition to cluster centroids determined by the plurality of threads and/or processors.

56. The apparatus of claim 47, wherein each of the plurality of threads and/or processors determines the one or more cluster centroids based on its assigned portion of the stream of data points.

57. The apparatus of claim 47, wherein the at least one processor is further configured to:
receive a clustered portion of the stream of data points from each of the plurality of threads and/or processors.

58. The apparatus of claim 47, wherein the at least one processor is further configured to:
perform post-processing on the single global universe of clusters.

59. The apparatus of claim 47, wherein the plurality of threads and/or processors reside on a mobile device.

60. The apparatus of claim 47, wherein the plurality of threads and/or processors reside on a plurality of mobile devices.

61. An apparatus for clustering a stream of data points, comprising:
means for receiving the stream of data points;
means for determining a plurality of cluster centroids;
means for dividing the plurality of cluster centroids into a plurality of groups of cluster centroids, wherein each group of the plurality of groups of cluster centroids contains at least one cluster centroid and less than all of the plurality of cluster centroids and is utilized independently by a different thread and/or processor among a plurality of threads and/or processors;
means for assigning a different portion of the stream of data points to each of the plurality of threads and/or processors, wherein each thread and/or processor of the plurality of threads and/or processors generates a plurality of clusters around the group of the plurality of groups of cluster centroids assigned to the thread and/or processor; and
means for concatenating the plurality of clusters generated by each of the plurality of threads and/or processors to generate a single global universe of clusters.

62. An apparatus for clustering a stream of data points, comprising:
means for receiving the stream of data points;
means for assigning a different portion of the stream of data points to each thread and/or processor of a plurality of threads and/or processors, wherein each thread and/or processor of the plurality of threads and/or processors determines one or more cluster centroids, and wherein each thread and/or processor of the plurality of threads and/or processors clusters incoming data points of the portion of the stream of data points assigned to the thread and/or processor around the one or more cluster centroids as the incoming data points are received by the thread and/or processor to generate one or more clusters; and
means for concatenating the one or more clusters from each of the plurality of threads and/or processors to generate a single global universe of clusters.

63. A non-transitory computer-readable medium for clustering a stream of data points, comprising:
at least one instruction to receive the stream of data points;
at least one instruction to determine a plurality of cluster centroids;
at least one instruction to divide the plurality of cluster centroids into a plurality of groups of cluster centroids, wherein each group of the plurality of groups of cluster centroids contains at least one cluster centroid and less than all of the plurality of cluster centroids and is utilized independently by a different thread and/or processor among a plurality of threads and/or processors;
at least one instruction to assign a different portion of the stream of data points to each of the plurality of threads and/or processors, wherein each thread and/or processor of the plurality of threads and/or processors generates a plurality of clusters around the group of the plurality of groups of cluster centroids assigned to the thread and/or processor; and
at least one instruction to concatenate the plurality of clusters generated by each of the plurality of threads and/or processors to generate a single global universe of clusters.

64. A non-transitory computer-readable medium for clustering a stream of data points, comprising:
at least one instruction to receive the stream of data points;
at least one instruction to assign a different portion of the stream of data points to each thread and/or processor of a plurality of threads and/or processors, wherein each thread and/or processor of the plurality of threads and/or processors determines one or more cluster centroids, and wherein each thread and/or processor of the plurality of threads and/or processors clusters incoming data points of the portion of the stream of data points assigned to the thread and/or processor around the one or more cluster centroids as the incoming data points are received by the thread and/or processor to generate one or more clusters; and
at least one instruction to concatenate the one or more clusters from each of the plurality of threads and/or processors to generate a single global universe of clusters.

* * * * *